(12) United States Patent
Winter

(10) Patent No.: US 6,603,714 B1
(45) Date of Patent: Aug. 5, 2003

(54) REPRODUCTION APPARATUS FOR DOUBLE-SIDED RECORDING MEDIA

(75) Inventor: Marco Winter, Hannover (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/460,610

(22) Filed: Dec. 14, 1999

(30) Foreign Application Priority Data

Dec. 22, 1998 (DE) .......................................... 198 59 069

(51) Int. Cl.⁷ .............................................. G11B 21/08
(52) U.S. Cl. .................................. 369/30.27; 369/30.15
(58) Field of Search ................................ 369/32, 44.37, 369/44.38, 47.1, 33, 30.27, 30.1, 30.11, 30.12, 33.01, 30.15

(56) References Cited

U.S. PATENT DOCUMENTS

| | | | |
|---|---|---|---|
| 4,873,679 A | * 10/1989 | Murai et al. .................. | 369/32 |
| 4,903,140 A | * 2/1990 | Okamoto et al. ........... | 369/199 |
| 4,929,946 A | 5/1990 | O'Brien et al. ................ | 341/87 |
| 5,235,575 A | * 8/1993 | Han ............................. | 369/32 |
| 5,253,242 A | * 10/1993 | Satoh et al. .................. | 369/47 |
| 5,469,418 A | * 11/1995 | Satoh et al. .................. | 369/54 |
| 5,633,847 A | * 5/1997 | Masuda et al. ............... | 369/48 |
| 5,970,029 A | * 10/1999 | Shinada ....................... | 369/33 |

FOREIGN PATENT DOCUMENTS

| | | |
|---|---|---|
| DE | 69023329 | 5/1996 |
| DE | 19604067 | 8/1997 |

* cited by examiner

Primary Examiner—Tan Dinh
(74) Attorney, Agent, or Firm—Joseph S. Tripoli; Harvey D. Fried; Francis A. Davenport

(57) ABSTRACT

The invention relates to an apparatus for reproduction of double-sided recording media without any reversal of the direction of rotation or changing or turning over of the recording medium. A reproduction apparatus is disclosed where one side of the double-sided recording medium is reproduced continuously by being read backwards section by section. A data stream corresponding to the continuous reading is provided by bit-by-bit reversal of the data read.

6 Claims, 3 Drawing Sheets

REPRODUCTION APPARATUS FOR DOUBLE-SIDED RECORDING MEDIA

FIELD OF THE INVENTION

The invention relates to a reproduction apparatus for double-sided recording media without any reversal of the direction of rotation or changing or turning over of the recording medium, such as for example a digital versatile disc, also referred to as DVD. In this case, recording media, which are pre-recorded on both sides, are designated as double-sided recording media.

BACKGROUND OF THE INVENTION

In the case of a DVD, it is possible for example for both sides of the disc to be pre-recorded. If such a disc is inserted into a customary reproduction apparatus, the reproduction apparatus can generally access only one side of the disc and the reproduction apparatus can read only one side of the double-sided disc. If the other side is to be read or reproduced, then the disc has to be taken out, turned over and reinserted.

However, reproduction devices for double-sided recording media are already known as well, in which one or two scanning devices is or are used to read both the top side and the underside of the recording medium. Since double-sided recording media are generally intended also to be suitable for reproduction in reproduction apparatuses which reproduce only one side of a recording medium, a spiral track of the recording medium is provided in such a way that it has a fundamentally corresponding progression, with reference to a direction of rotation of the disc turntable on which the recording medium rests, even after the side has been changed over. Therefore, in order to reproduce double-sided recording media in reproduction apparatuses with two-sided scanning of the recording medium, the direction of rotation of the recording medium is reversed in order to carry out reproduction of information stored on the recording medium in a chronological order. In order to change over the reproduction from one side to the other side, it is necessary, therefore, firstly to stop the disc turntable rotation and then to accelerate it in the opposite rotational direction. This operation not only requires a corresponding period of time for which reproduction is interrupted, but also leads to a corresponding expenditure of energy, necessary for braking and accelerating the disc turntable including recording medium.

SUMMARY OF THE INVENTION

A reproduction apparatus for double-sided recording media enables double-sided recording media to be reproduced without any reversal of the direction of disk rotation or changing or turning over of the recording medium.

The invention facilitates reproduction of double-sided recording media without any reversal of the direction of rotation or changing or turning over of the recording medium. Usually the reproduction of recording media in reproduction apparatuses which scan on one side, is facilitated by the recording medium being changed or turned over, or in reproduction apparatuses which scan on both sides, by the direction of rotation being reversed.

In an inventive arrangement a reproduction apparatus is provided in such a way that one side of the recording medium is scanned in the customary manner, as is known from reproduction apparatuses which scan on one side, and the other side of the recording medium is scanned, without any reversal of the direction of rotation or changing or turning over of the recording medium, by being read backwards portion by portion or section by section. A track portion or section is a section that is scanned or read between two jumps of the scanning device. The scanned data are buffer-stored and the buffer-stored track portion is reversed bit by bit. That bit of the entire track portion which was read first consequently becomes the last bit, the next bit of the entire track portion that was read in becomes the penultimate bit, and so on. Once the bit-by-bit reversal of the track portion has been concluded, the correctly orientated data of this track portion are available.

The converted data are then utilized conventionally or analogously to the other side of the recording medium. In order to ensure the data rate necessary for reproduction even in the course of backwards reading portion by portion, a higher read-in data rate is necessary on account of the additional jumps of the scanning device, which data rate is already provided in the case of reproduction apparatuses that already scan at multiple speeds or is achieved by increasing the rotational speed of the recording medium.

In principle, a complete track portion is read in order to be able to utilize this track portion from its beginning to its end. This means that a buffer memory is necessary in order to buffer-store a complete track portion that has been read backwards. However, buffer memories are already provided, in principle, in reproduction apparatuses for optical recording media for the purpose of buffer-storing data read from the recording medium, with the result that, in an advantageous manner, a buffer memory that is already present can also be used by extending it by the function of section-by-section bit reversal. In this case, the individual sections each correspond to a track portion that has been read in and whose address range is recorded in the buffer memory, or between which a section marking is inserted.

This advantageously enables double-sided recording media to be reproduced without any reversal of the direction of rotation or changing or turning over of the recording medium.

The reproduction of double-sided recording media without any reversal of the direction of rotation or changing or turning over of the recording medium can be carried out in reproduction apparatuses which scan on both sides and have a scanning device on each side of the recording medium or a scanning device which is moved or pivoted over from one side to the other side of the recording medium. Applicant's advantageous arrangement for reproducing double-sided recording media does not necessitate firstly stopping the disc turntable and then accelerating it again in the opposite direction, since the reproduction of both sides of the double-sided recording medium is advantageously provided with the direction of rotation of the recording medium being maintained. The reproduction does not have to be interrupted and energy required for braking and accelerating the disc turntable including recording medium is saved.

BRIEF DESCRIPTION OF THE DRAWINGS

The invention is explained in more detail below with reference to drawings.

In the Figures.

DETAILED DESCRIPTION OF THE PREFERRED EMBODIMENTS

Figure 2:
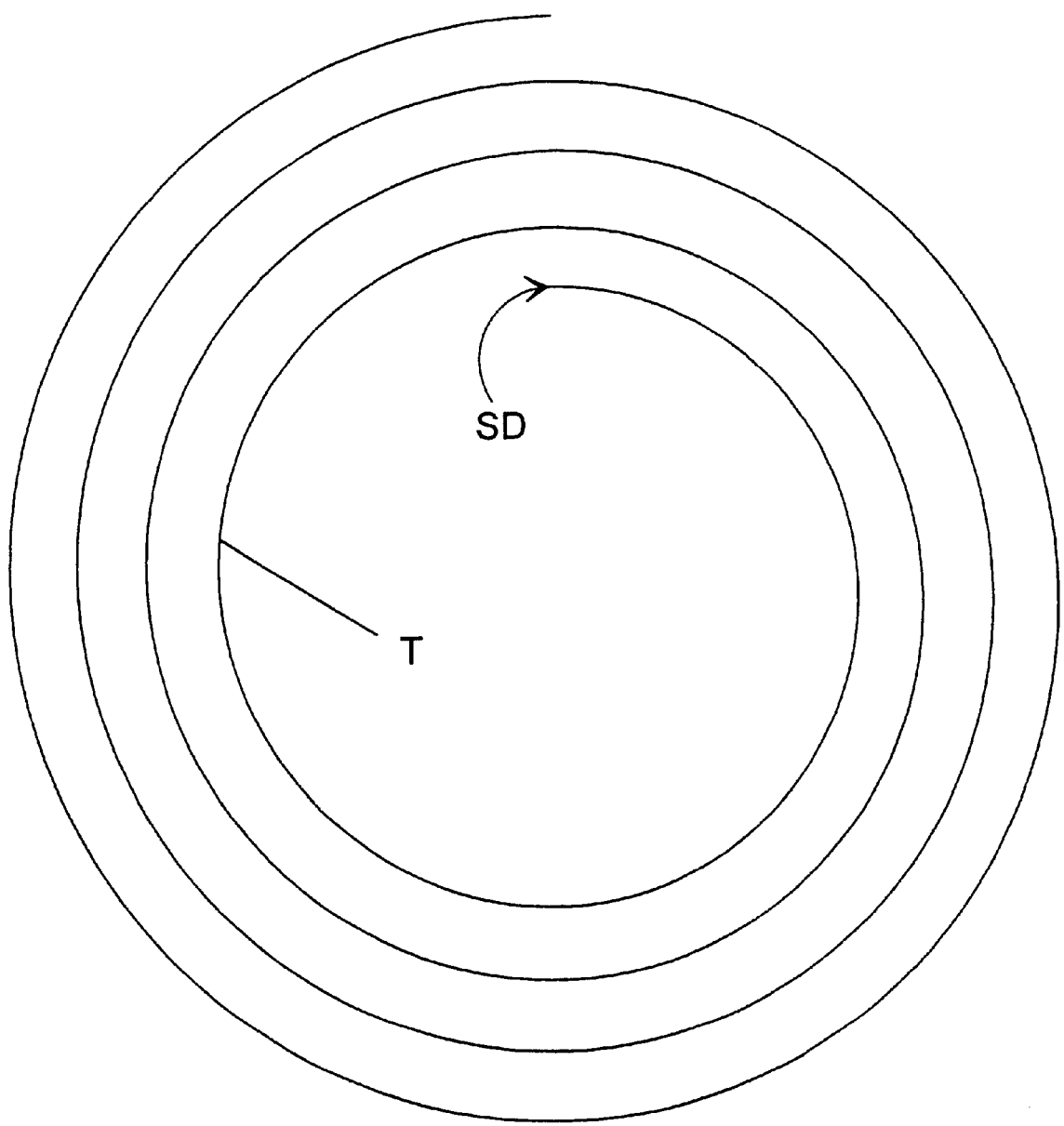
FIG. 2 shows a schematic sketch for the conventional scanning of a double-sided recording medium.
Figure 3:
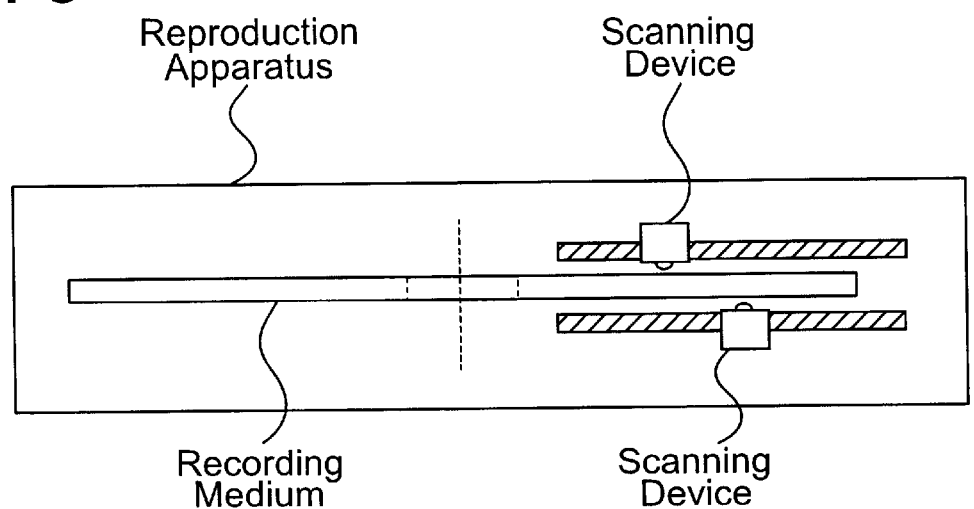
FIG. 3 shows a reproduction apparatus having a scanning device on each side of the recording medium.
Figure 4:
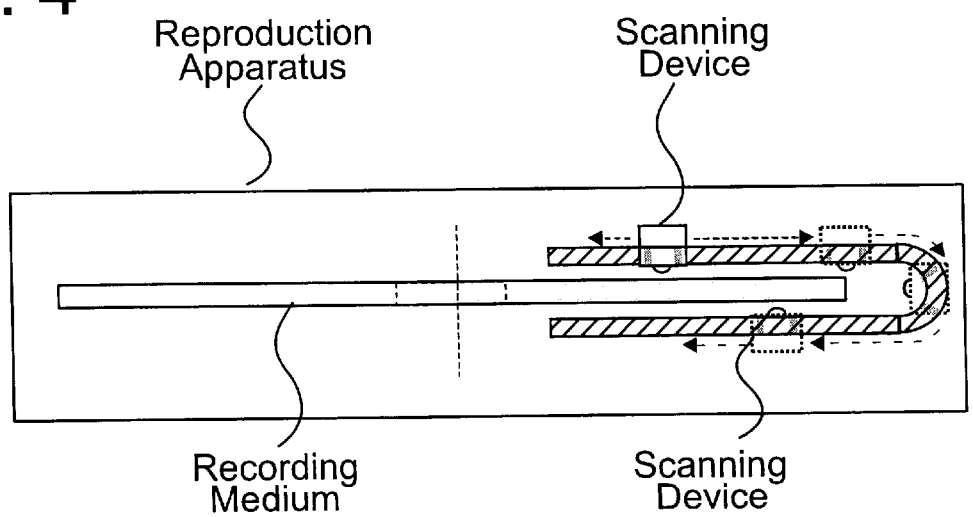
FIG. 4 shows a scanning device which is pivoted or moved from one side of the recording medium to the other.

FIG. 2 illustrates the schematic sketch of the spiral track T of a recording medium. The spiral track T runs in the clockwise direction from the inside outwards. Seen from the scanning side, the recording medium is read continuously by anticlockwise rotation of the recording medium above a scanning device that follows the scanning radius of the spiral track T of the recording medium. The spiral track T of the recording medium is read in the clockwise direction in accordance with the standard of optical recording media. When seen from the label side of single-sided optical recording media or in a plan view of a recording medium that is scanned from underneath, therefore, the direction of rotation of the recording medium also follows the clockwise direction.

In order to enable the reproduction and recording of double-sided recording media also in apparatuses with apparatuses which read or record the recording medium only on one side, the spiral track T, in the case of double-sided recording media as well, is provided such that it runs in the clockwise direction from the inside outwards on each side. On account of the predetermined spiral track T, the recording medium must be rotated in a specific direction in order that the recording medium can be read continuously.

Since the direction of rotation of the recording medium is predetermined by the progression of the spiral track T, it is not possible for the other side of the recording medium also to be read continuously in a reproduction apparatus which scans on both sides with the direction of rotation being maintained.

Figure 1:
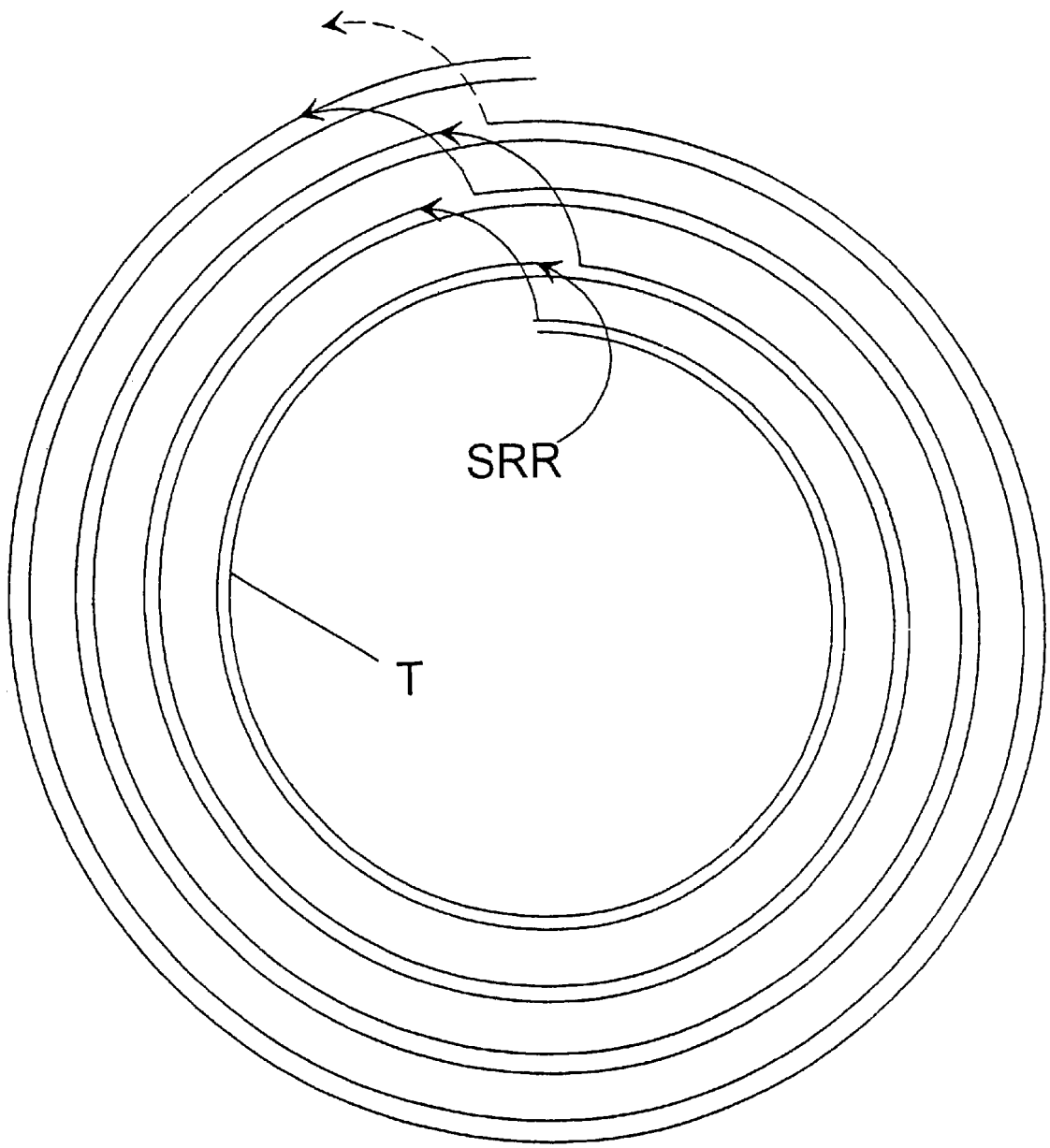
FIG. 1 shows a schematic sketch for the reading of a double-sided recording medium backwards.

In order, nevertheless, to enable a double-sided recording medium to be reproduced without any reversal of the direction of rotation or changing or turning over of the recording medium, a reproduction apparatus which scans on both sides is provided by means of which one side of the double-sided recording medium is reproduced by being read backwards section by section. The principle of reproduction according to the invention is illustrated in FIG. 1. The second side of the double-sided recording medium also has a spiral track T that runs in the clockwise direction from the inside outwards. However, the direction of rotation of the recording medium is already predetermined by the direction of rotation, which is necessary for the continuous reading of the other side of the recording medium. The likewise clockwise direction of rotation prevents the recording medium from being read continuously from the inside outwards. It is provided, therefore, that the reading of the recording medium is not begun at the inner start of the spiral track T, in accordance with FIG. 2, rather the reading of the recording medium is started, in accordance with FIG. 1, at a point on the spiral track T which, after a predetermined track portion or section, follows the inner start of the spiral track T. The start of backwards reading SRR is provided at this point. FIG. 1 illustrates the reading path of the spiral track T parallel to the spiral track T, exclusively for the purpose of clearly illustrating the reading process. Since the recording medium is rotated in the clockwise direction, the inner start of the spiral track T is reached, beginning at the point where backwards reading SRR is started, by virtue of the spiral track T being read backwards. As a result, a first section or a first track portion of the spiral track T of the recording medium is scanned, although backwards. Information items of the recording medium that are read in this way are read into a buffer memory, which is then read bit by bit in the opposite direction. That bit of the entire track portion that was read first consequently becomes the last bit, the next bit of the entire track portion that was read in becomes the penultimate bit, and so on. Once the bit-by-bit reversal of the track portion has been concluded, the correctly orientated information or data of this track portion are available.

A track portion or section is a section that is read between two jumps of the scanning device. With the scanning device, a jump is made firstly to a point where backwards reading SRR starts, then the inner start of the spiral track T is reached by virtue of the spiral track T of the recording medium being followed, and from there a jump is made beyond the point where backwards reading SRR starts to a larger scanning diameter of the spiral track T of the recording medium. Beginning at this scanning point, the recording medium is then once again scanned backwards as far as the previous point where backwards reading SRR started. The data or information from the track portions which is reversed in a bit-by-bit manner and strung together then corresponds to the data or information which would also have been scanned in the event of continuous scanning of the recording medium.

In principle, a complete track portion or a complete section is read in order that this track portion can be utilized from its beginning to its end. The length of the sections or track portions is determined by the size of the available buffer memory and the ratio of the speed at which data are read to and from the buffer memory. Since buffer memories are generally present in reproduction apparatuses for optical recording media, in an advantageous manner it is also possible to use a buffer memory which is already present in the apparatus and is extended by the function of section-by-section bit reversal. For the purpose of bit reversal or reversal of the direction of the sequence of bits read from the recording medium, either the address range of the buffer memory which corresponds to a section is recorded or section markings are inserted between the individual sections, which correspond to track portions. The converted data then corresponds to the data, which would also have been read in the event of continuous reading of the recording medium.

If the address of a scanning location on the second side of the recording medium is already known from reading the first side of the double-sided recording medium, or after the reading of a list of contents provided on the second side, the reproduction can be begun at any desired location on the second side as well, in that, with the scanning device, a jump is made to a scanning location which is situated downstream of the desired scanning location on the recording medium, in accordance with the length of a section that is to be read backwards.

For the continuous reproduction of the second side of the double-sided recording medium, the additional jumps of the scanning device require a higher data rate, which is already provided in the case of reproduction apparatuses which already scan at multiple speeds or is achieved by increasing the rotational speed of the recording medium.

The reproduction of double-sided recording media without any reversal of the direction of rotation or changing or turning over of the recording medium is carried out in reproduction apparatuses which scan on both sides and have a scanning device on each side of the recording medium or a scanning device which is moved or pivoted over from one side to the other side of the recording medium. The reproduction of double-sided recording media is advantageously achieved without any reversal of the direction of rotation or changing or turning over of the recording medium, with the result that reproduction need not be interrupted and, furthermore, energy is saved which would otherwise be necessary for braking and accelerating the recording medium.

What is claimed is:

1. A reproduction apparatus for double-sided recording media, wherein when said reproduction apparatus scans on both sides, one side of the double-sided recording medium reproduces recorded content in a reversed order section by section.

2. Reproduction apparatus according to claim 1, wherein the recording medium is rotated counter to its standard scanning direction in order to be read backwards section by section, and a scanning device is positioned before the start of the data to be reproduced in accordance with the length of a section to be read backwards.

3. Reproduction apparatus according to claim 1, wherein the reproduction apparatus has a scanning device on each side of the recording medium.

4. Reproduction apparatus according to claim 1, wherein the reproduction apparatus has a scanning device which is moved or pivoted over from one side of the recording medium to the other side of the recording medium.

5. Reproduction apparatus according to claim 1, wherein a bit-by-bit reversal of the direction of the read section is carried out in order to reproduce sections of the double-sided recording medium that have been read backwards.

6. Reproduction apparatus according to claim 1, wherein the recorded content reproduced in a reversed order section by section is stored and read in a reverse direction to restore the recorded content sequence.

* * * * *